(12) United States Patent
Giannopoulos (10) Patent No.: US 7,327,130 B1
(45) Date of Patent: Feb. 5, 2008

(54) CURRENT SENSE METHOD

(75) Inventor: Demetri Giannopoulos, Austin, TX (US)

(73) Assignee: Zilker Labs, Inc., Austin, TX (US)

(*) Notice: Subject to any disclaimer, the term of this patent is extended or adjusted under 35 U.S.C. 154(b) by 0 days.

(21) Appl. No.: 11/425,515

(22) Filed: Jun. 21, 2006

(51) Int. Cl.
*G05F 1/40* (2006.01)
*G05F 1/56* (2006.01)
*H02H 7/00* (2006.01)

(52) U.S. Cl. .................. 323/285; 323/275; 323/282
(58) Field of Classification Search ............ 323/223, 323/225, 226, 265, 268, 271, 273, 275–277, 323/282, 285, 907, 908; 361/18
See application file for complete search history.

(56) References Cited

U.S. PATENT DOCUMENTS

| | | | |
|---|---|---|---|
| 5,325,258 A * | 6/1994 | Choi et al. ................. 361/87 |
| 5,504,448 A * | 4/1996 | Bennett et al. ............ 327/379 |
| 6,424,129 B1 * | 7/2002 | Lethellier .................. 323/272 |
| 6,483,352 B1 | 11/2002 | Kuo et al. |
| 6,483,353 B2 | 11/2002 | Kim et al. |
| 6,552,579 B1 * | 4/2003 | Knoedgen .................. 327/51 |
| 6,621,259 B2 | 9/2003 | Jones et al. |
| 6,646,847 B2 | 11/2003 | Poe et al. |
| 6,734,656 B2 * | 5/2004 | Miller et al. ............... 323/284 |
| 6,791,811 B2 | 9/2004 | Poe et al. |
| 6,798,250 B1 | 9/2004 | Wile |
| 6,801,030 B2 | 10/2004 | Tai et al. |
| 6,836,155 B2 | 12/2004 | Shim |
| 6,853,174 B1 * | 2/2005 | Inn ............................. 323/285 |
| 6,853,562 B2 | 2/2005 | Zhang |
| 6,876,190 B2 | 4/2005 | Tai et al. |
| 6,888,401 B1 | 5/2005 | Tanase |
| 6,930,474 B2 | 8/2005 | Wang |
| 6,946,882 B2 | 9/2005 | Gogl et al. |
| 7,015,728 B1 | 3/2006 | Solic |
| 7,019,581 B1 | 3/2006 | Potanin et al. |
| 7,038,963 B2 | 5/2006 | Lee |
| 7,099,218 B2 | 8/2006 | Wicht et al. |
| 7,113,591 B2 | 9/2006 | Lomax, Jr. et al. |

* cited by examiner

*Primary Examiner*—Matthew V. Nguyen
(74) *Attorney, Agent, or Firm*—Meyertons Hood Kivlin Kowert & Goetzel, P.C.; Jeffrey C. Hood (57) ABSTRACT

A current-sense circuit for measuring a load current in a switching power regulator may operate independently of process variation and temperature, and measure bi-directional load currents without requiring high-speed, high-voltage amplifiers for operation. A positive sense voltage may be generated for positive and/or negative values of a switch current conducted by a power switching device in the switching power regulator, by applying a linear transformation to a switch voltage developed across the power switching device according to the switch current. A first sense current may be generated by applying the positive sense voltage across a matching switching device having a same channel length as the power switching device. A second sense current may be generated independently of the switch voltage, and a total sense current that is proportional to the switch current may be calculated by subtracting the second current from the first current. The ratio of the total sense current and the switch current will be independent of process variation and temperature.

23 Claims, 9 Drawing Sheets

CURRENT SENSE METHOD

BACKGROUND OF THE INVENTION

1. Field of the Invention

This invention relates to the design of power converters and, more particularly, to designing current-sense circuitry in power converters.

2. Description of the Related Art

Power consumption of integrated circuits (ICs) has been on the rise with the development of high performance, high density systems, most notably central processing units (CPUs) manufactured by companies like Intel and AMD. For example, the highest density processors from manufacturers such as Intel went from a power consumption rate of about 30 Watts at 3.3 V to a power consumption rate of about 90 Watts at 1.5 V. A simple application of the power-voltage-current relationship reveals that the total current consumed by these chips has increased from nine amps to about 60 amps in a very short time period. Similar analogies may be applied to all larger digital integrated circuits. This rapid evolution has presented new and significant problems in delivery of the power to and removal of waste heat from the ICs. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Figure 1:
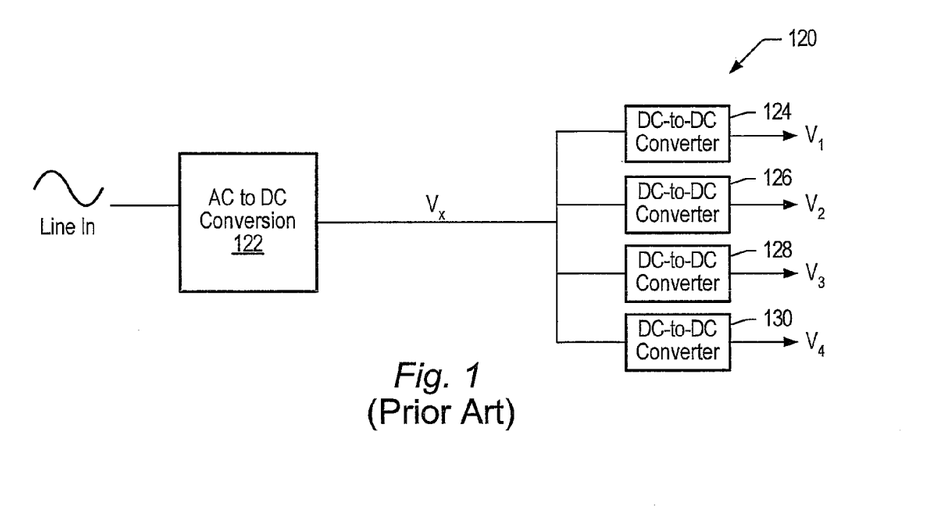
FIG. 1 shows distributed power architecture (DPA) according to prior art.

In most current IC systems, an AC supply voltage is typically converted to an intermediate DC voltage and routed to the point-of-load (POL), where it is locally converted down to the required voltage. This technique commonly referred to as "Distributed Power Architecture" (DPA) is illustrated in FIG. 1. As shown in DPA system 120 of FIG. 1, an AC to DC voltage converter 122 may produce an intermediate DC voltage Vx, which may be routed to individual local DC to DC (DC-DC) converters 124, 126, 128, and 130, which in turn may provide the required DC voltages V1, V2, V3, and V4, respectively, to their corresponding POLs. With a DPA, errors may be reduced since the distance traveled by a high-current signal is minimized, thus reducing I×R (resistive) and L di/dt (inductive) errors.

The DC-to-DC conversion in DC-DC converters, such as those shown in FIG. 1, is often performed by having switching power regulators/converters, also known as step-down regulators/converters, converting a higher voltage (e.g. 12V) to a lower value as required by the powered load devices. These switching power converters typically require current-sensing to implement both control and protection functions. Current-sharing in multi-phase power converters and current-mode control are examples of control functions. Overload protection (including short-circuit protection) also require current-sensing.

Most existing current-sensing methods are typically divided into "lossy" and "lossless" categories. The lossless methods oftentimes make use of existing parasitic resistances, for instance the $R_{DS\_on}$ on-state resistance of a power MOSFET, the series resistance of an inductor, or the trace resistance of a printed circuit board (PCB). These methods generally do not introduce additional power losses. They are most attractive in high-current applications where an additional sense-resistor can reduce the overall efficiency of the power converter. However they suffer from low accuracy due to tolerances and temperature dependency of the parasitic resistance. The addition of an accurate sense-resistor— e.g. in series with a power MOSFET or in series with the load—as part of a lossy current-sensing method may improve accuracy at the expense of increased power losses.

Figure 2:
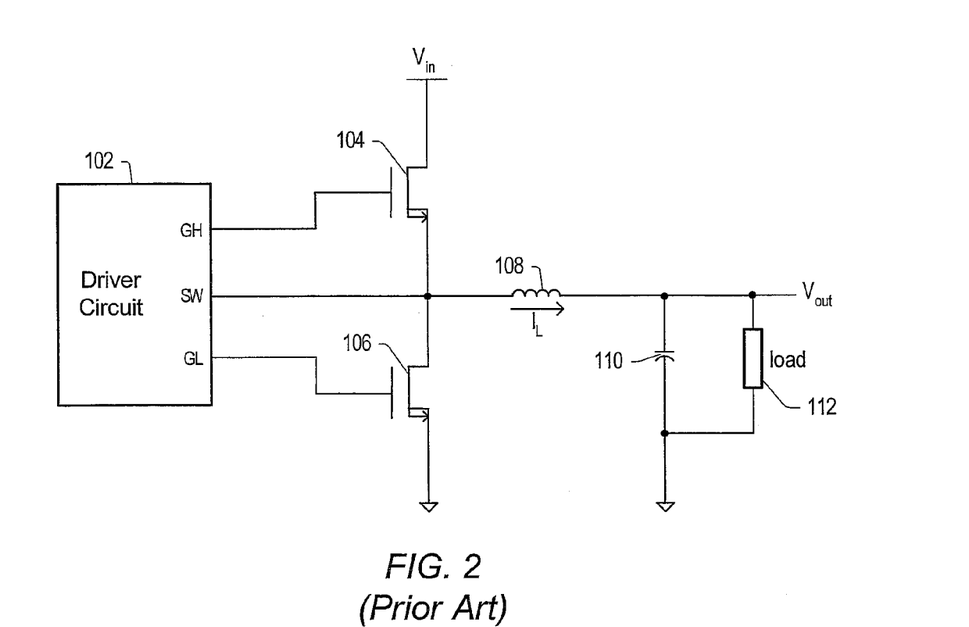
FIG. 2 shows one embodiment of a synchronous buck converter according to prior art.
Figure 3A:
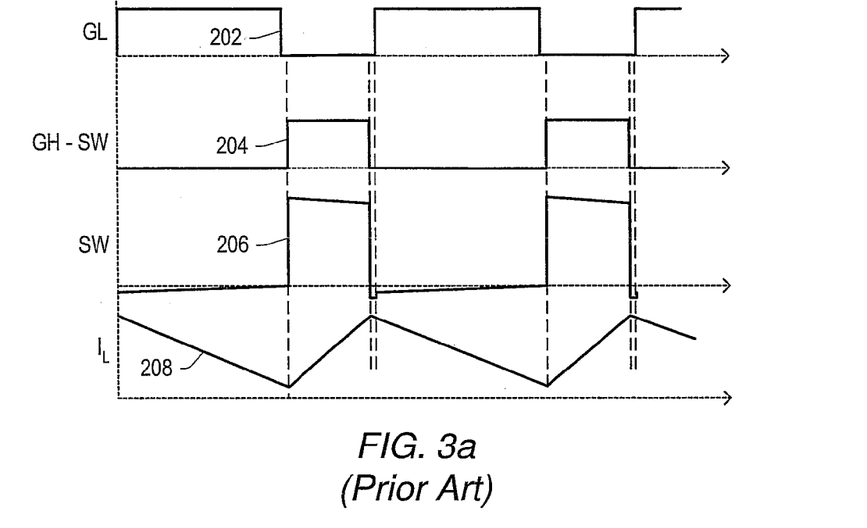
FIG. 3a shows voltage waveforms for key operating signals of a buck converter with the load current remaining positive during the entire switching period, according to prior art.
Figure 3B:
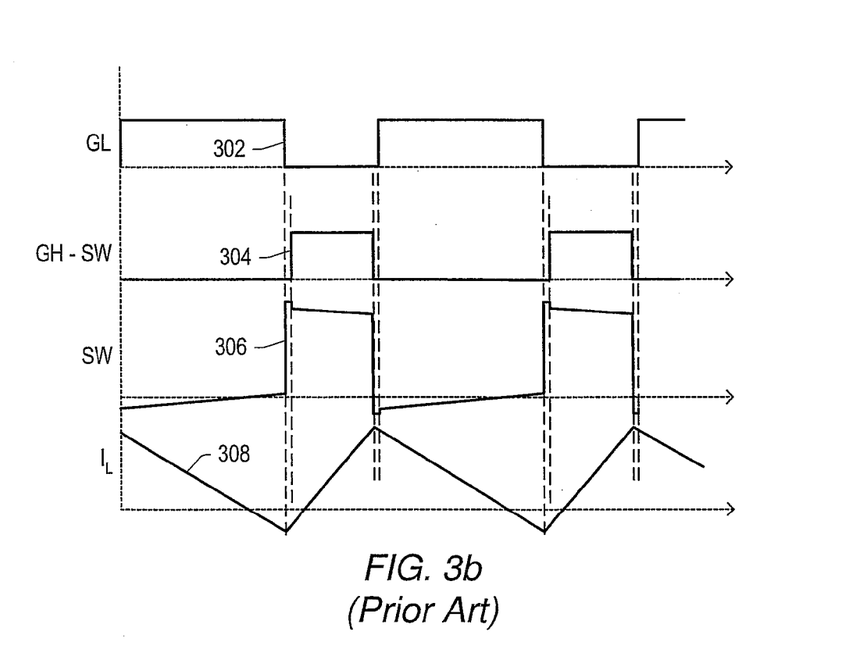
FIG. 3b shows voltage waveforms for key operating signals of a buck converter with the load current becoming negative during a portion of the switching period, according to prior art.

FIG. 2 shows one example of a switching voltage (power) regulator, a synchronous buck converter in this case, which generates a DC output voltage $V_{out}$ from a DC input voltage $V_{in}$. Two power NMOS devices, a high-side NMOS device 104 and a low-side NMOS device 106, may be controlled by driver 102 to alternatively direct the load current $I_L$ to input $V_{IN}$ and ground. Inductor 108 and capacitor 110 may be used to smooth out the voltage waveform generated at node SW, resulting in output voltage $V_{out}$ generated across load 112. FIG. 3a shows key waveforms such as waveform 202 for gate drive GL (voltage across node GL and ground), waveform 204 for gate drive GH-SW (voltage across nodes GH and SW), waveform 206 for the switch node SW (voltage across SW and ground) and waveform 208 for the load current $I_L$. As seen in FIG. 3a, the ripple in load current 208 is small enough for $I_L$ to remain positive during the entire switching period. For small inductor values of inductor 108, the larger ripple in load current $I_L$ may result in negative $I_L$ for at least a portion of the switching period as shown by waveform 308 in FIG. 3b. The load current can be negative throughout the entire switching period, if power is transferred from load 112 to input $V_{in}$. Therefore, any practical current sensing method for power switches 104 and 106 would require handling bidirectional currents through the switches (NMOS devices 104 and 106).

Certain FET based current-sense methods can result in virtually lossless measurement of high current levels. In applications where a power MOSFET is integrated with its driver, a matching current-sense MOSFET connected in parallel to the power device can be used to generate a current that is a small fraction of the power device current. Typically, an integrated power MOSFET has multiple poly gate fingers. The sense FET can consist of one or more matching poly gate fingers. The ratio of the channel width of the power device to the channel width of the sense device can be chosen to be high (around 1000) to keep the power losses low. Ideally, it is desirable to have the ratio of the sense FET current to the power switch current be process variation and temperature independent to obtain an accurate current measurement. It should be noted that while only the use of NMOS power switches is mentioned, current-sense methods can be implemented with both NMOS and/or PMOS power switches.

Figure 4:
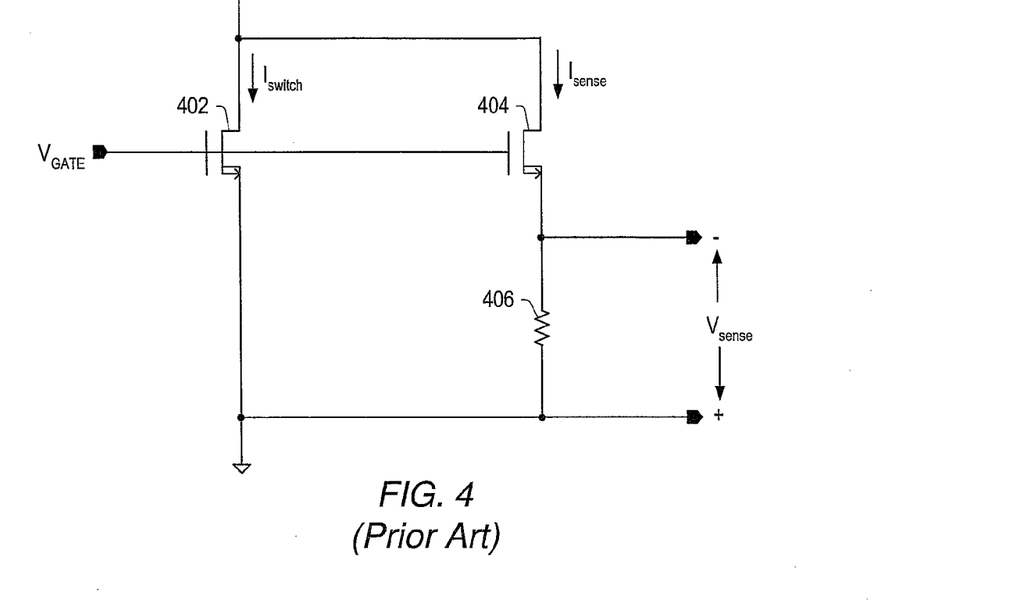
FIG. 4 shows one embodiment of a FET based current-sense circuit, according to prior art.

FIG. 4 shows a FET based current-sense method, with sense FET 404 configured to sense current for switching transistor 402. The sensed current $I_{sense}$ is conducted by $R_{sense}$ resistor 406, which can be configured either on-chip or off-chip. Analyzing the circuit in FIG. 4, the following relationships can be established:

$$\frac{I_{switch}}{I_{sense}} = \frac{R_{on\_404} + R_{sense}}{R_{on\_402}}, \qquad (1)$$

where $R_{on\_404}$ is the effective resistance of NMOS device 404 and $R_{on\_402}$ is the effective channel resistance of NMOS device 402 in its on state. In this case, both NMOS devices 402 and 404 are the same type MOSFET devices with the same channel length L. Furthermore, if NMOS device 404 has been designed such that $V_{GS}-V_{TH}>>V_{DS}$, then $$\frac{R_{on\_404}}{R_{on\_402}} \cong \frac{W_{402}}{W_{404}}, \quad (2)$$

where $W_{402}$ represents the channel width of NMOS device 402 and $W_{404}$ represents the channel width of NMOS device 404. It follows from equations 1 and 2 that:

$$\frac{I_{switch}}{I_{sense}} = \frac{W_{402}}{W_{404}} * \left[1 + \left(\frac{R_{sense}}{R_{on\_402}} * \frac{W_{404}}{W_{402}}\right)\right], \text{ and} \quad (3)$$

$$\frac{I_{switch}}{V_{sense}} = \frac{I_{switch}}{I_{sense} * R_{sense}} = \frac{W_{402}}{W_{404}} * \left[\frac{1}{R_{sense}} + \left(\frac{1}{R_{on\_402}} * \frac{W_{404}}{W_{402}}\right)\right]. \quad (4)$$

On important drawback of the FET based current-sense method shown in FIG. 4 is that $$\frac{I_{switch}}{I_{sense}} \text{ and } \frac{I_{switch}}{V_{sense}}$$

are both affected by process variations and temperature.

Figure 5:
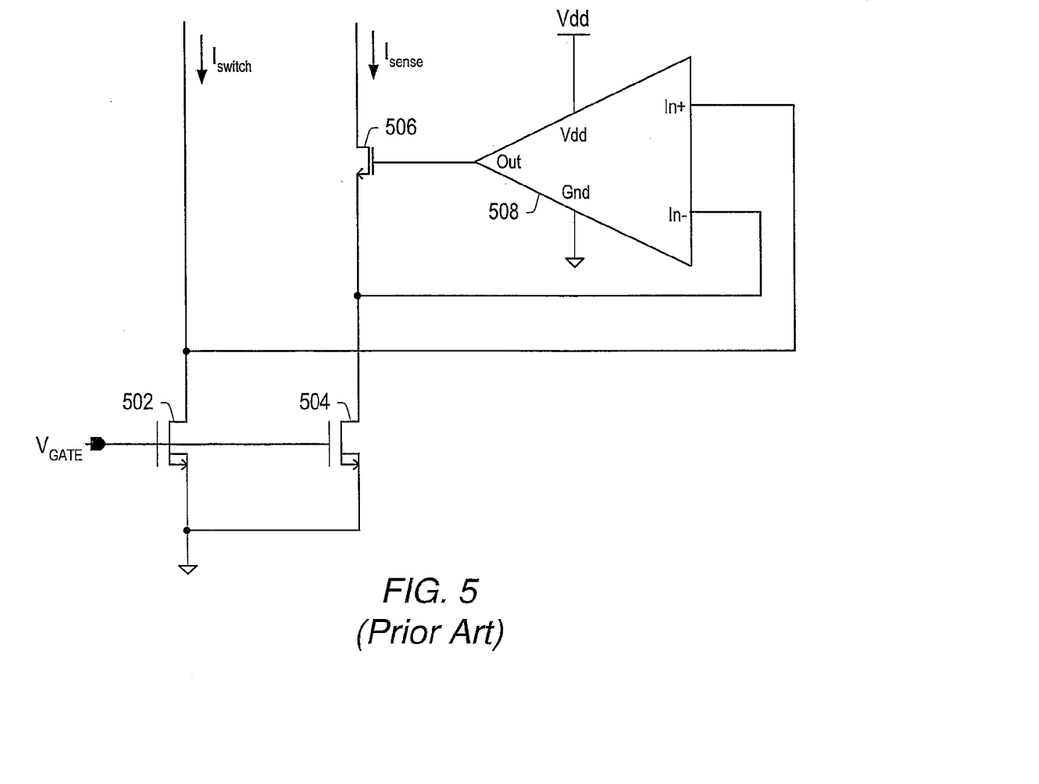
FIG. 5 shows one embodiment of a FET based current-sense circuit that operates unaffected by process variation and temperature, according to prior art.

FIG. 5 shows another current-sensing method that can be used for measuring the current of an integrated switching device 502[1]. An amplifier 508 imposes the $V_{DS}$ voltage of switching device 502 across sense FET 504. Furthermore the same $V_{GS}$ voltage is applied to switching device 502 and sense FET 504. As a result $$\frac{I_{switch}}{I_{sense}} = \frac{W_{502}}{W_{504}}, \quad (5)$$

where $W_{502}$ represents the channel width of switching device 502 and $W_{504}$ represents the channel width of sense FET device 504. The ratio $$\frac{I_{switch}}{I_{sense}}$$

in equation 5 is fabrication process and temperature independent. This method, however, can generally not be used in applications where the measured power switch current $I_{switch}$ is bi-directional. Furthermore, in applications where the drain voltage of switching device 502 switches between a low on-state and a high off-state voltage, the input In+ of amplifier 508 can be exposed to both high voltage values and high dv/dt transitions. Therefore, a high-speed, high-voltage amplifier is typically required. Designing a high-speed amplifier with high-voltage devices can be difficult.

Figure 6:
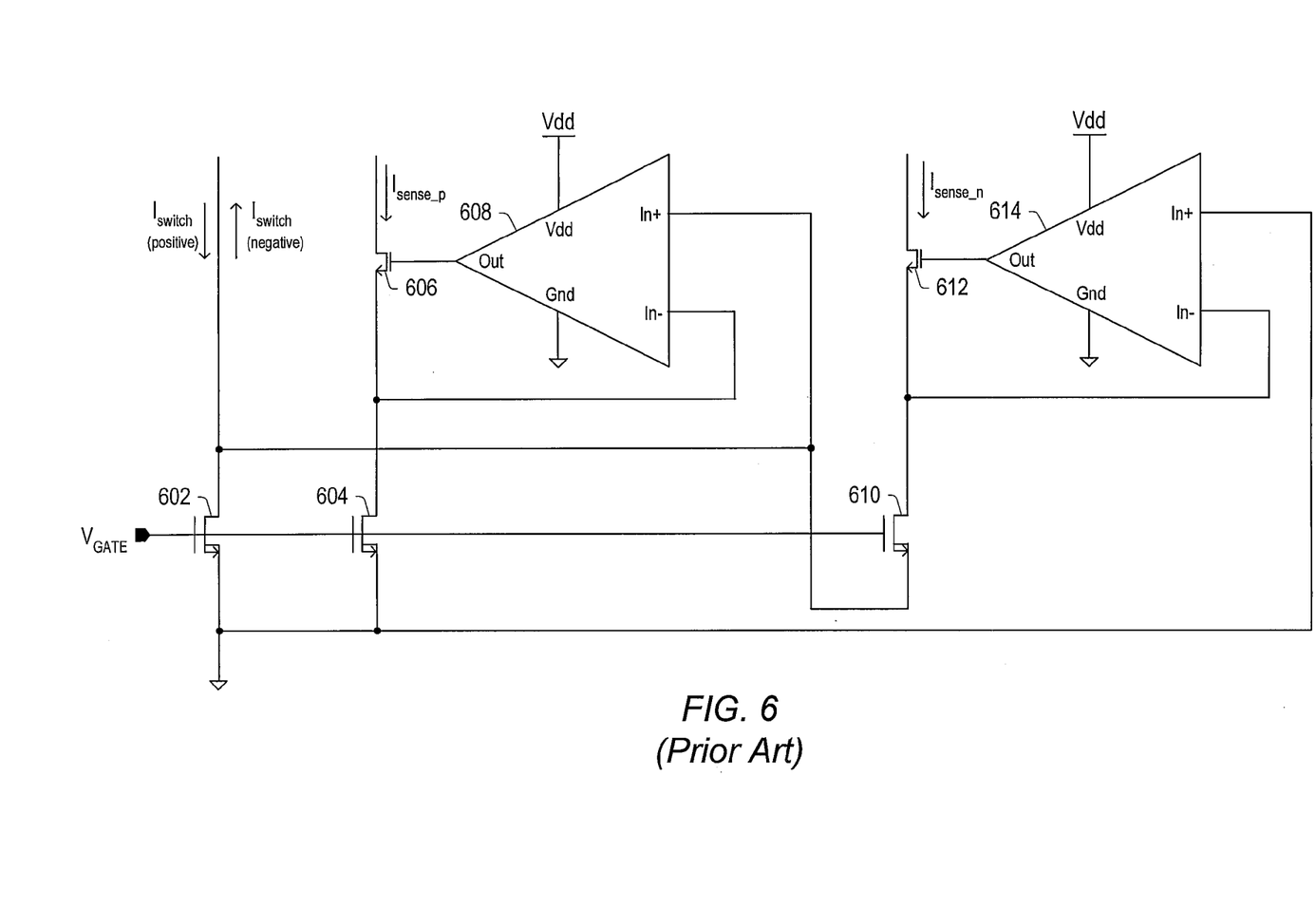
FIG. 6 shows one embodiment of a current-sense circuit for measuring bidirectional current $I_{switch}$, according to prior art.

FIG. 6 shows a current-sense method that utilizes circuit blocks comprising sense FETs 604 and 610, and amplifiers 608 and 614, respectively, to generate a scaled-down copy of the switch current $I_{switch}$ for both positive and negative $I_{switch}$ values, for sensing current for switching device 602[2]. Specifically, $I_{sense\_p}$ is proportional to the power switch current $I_{switch}$ for positive values of $I_{switch}$ and zero for negative values of $I_{switch}$. $I_{sense\_n}$ is proportional to the power switch current $I_{switch}$ for negative values of $I_{switch}$ and zero for positive values of $I_{switch}$. The sum sense current of the two component sense currents ($I_{sense\_n}+I_{sense\_p}$) will have a proportionality factor to switch current $I_{switch}$ that is process variation and temperature independent. Since both amplifiers 608 and 614 are connected to the drain of switching device 602, they can be exposed to both high voltage values and high dv/dt transitions, requiring a high-speed, high-voltage amplifier implementation. Zero-current crossover distortion due to different input offsets of amplifiers 608 and 614 may present a potential issue. Specifically, if the value of switch current $I_{switch}$ is around zero, the output currents of both amplifiers 608 and 614 can be zero.

Figure 7:
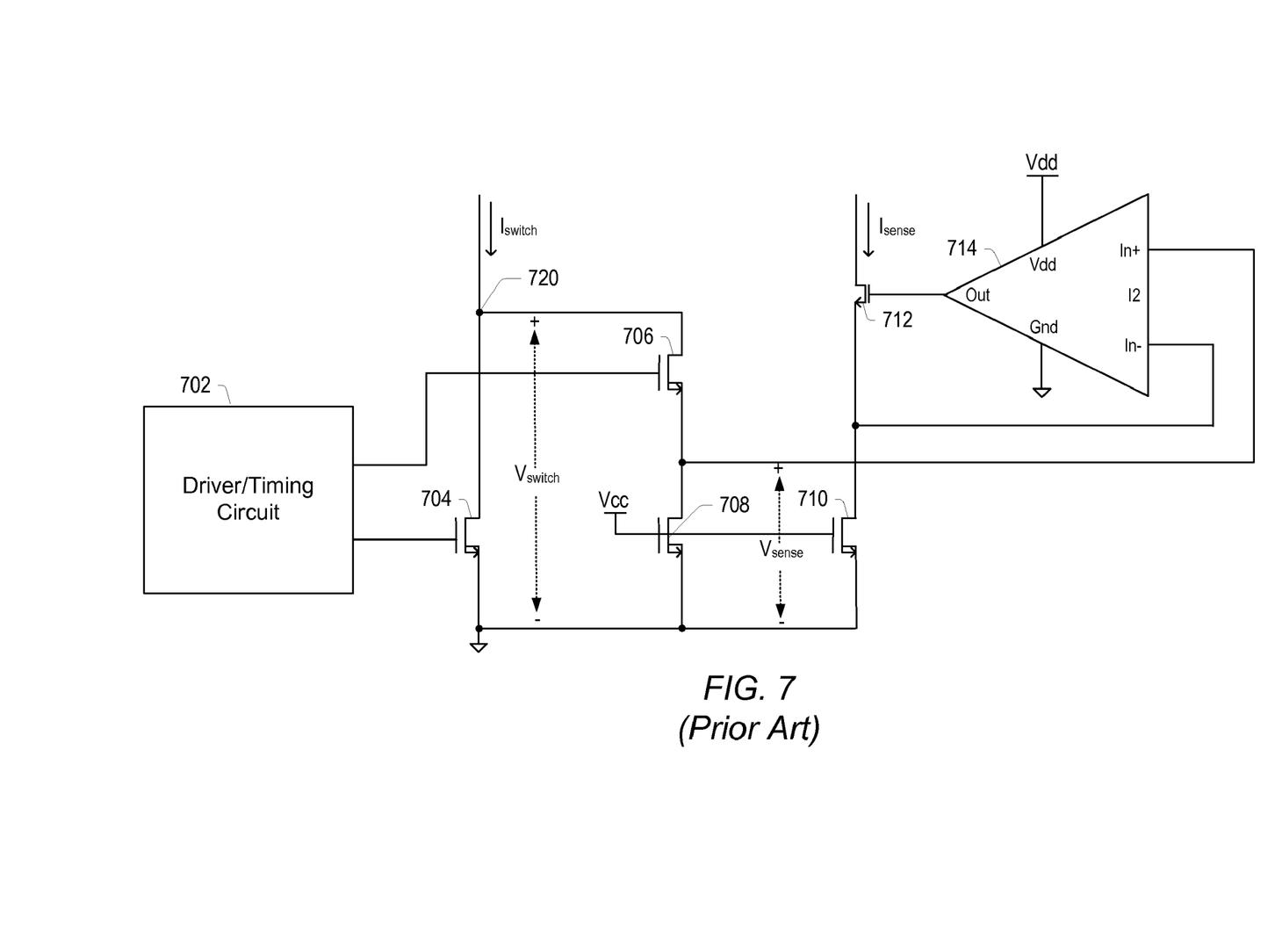
FIG. 7 shows one embodiment of a process variation and temperature independent current-sense circuit for measuring unidirectional current $I_{switch}$, according to prior art.

FIG. 7 shows yet another current-sensing method, where matching devices 706 and 708 scale the switch voltage $V_{switch}$ down to $V_{sense}$ when switching device 704 is conducting[3]. The ratio of $V_{sense}$ to $V_{switch}$ is in this case:

$$\frac{V_{switch}}{V_{sense}} = \frac{W_{706}}{W_{706} + W_{708}} = k < 1, \quad (6)$$

where $W_{706}$ represents the channel width of switching device 706 and $W_{708}$ represents the channel width of switching device 708. $V_{sense}$ forms the input to amplifier 714. If sensing device 710 matches switching device 704, then $$\frac{I_{switch}}{I_{sense}} = \frac{W_{704}}{W_{710}} * \frac{W_{706} + W_{708}}{W_{706}}, \quad (7)$$

[1] Design Of Analog CMOS Integrated Circuits, McGraw-Hill 2001 [2] U.S. Pat. No. 6,445,244 [3] U.S. Pat. No. 6,559,684 where $W_{704}$ represents the channel width of switching device 704 and $W_{710}$ represents the channel width of sensing device 710. When switching device 704 is not conducting and the drain voltage $V_D$ of switching device 704 goes high, then device 706 is turned off, thus shielding amplifier 714 from high input voltages. Therefore, the requirement for a high-speed, high-voltage amplifier is eliminated. However, the current-sense method shown in FIG. 7 could generally not be used for sensing a bi-directional power switch current $I_{switch}$.

Many other problems and disadvantages of the prior art will become apparent to one skilled in the art after comparing such prior art with the present invention as described herein.

SUMMARY OF THE INVENTION

In one set of embodiments, a current-sense circuit for measuring a load current (or switching current) in a switching power regulator may be configured to operate independently of process variation and temperature, and to measure bi-directional load currents without requiring high-speed, high-voltage amplifiers for operation. A current-sense circuit for sensing the load current—which may be a switch current conducted in a power switching device configured in the switching power regulator—may include a first sense circuit coupled to the power switching device to generate a first current for positive and/or negative values of the switch current. A second sense circuit may also be coupled to the power switching device to generate a second current for positive and/or negative values of the switch current. A sense current may be obtained by subtracting the second current from the first current, with the sense current being proportional to the switch current, and the ratio of the sense current and the switch current being independent of process variation and temperature. The generation of the first current and the second current may be unaffected if a high voltage is developed across the power switching device.

In one embodiment, the first sense circuit includes an input circuit configured to generate a first sense voltage based on a control voltage used to control the power switching device, and on a switch voltage developed across the power switching device according to the switch current. A first amplifier having a pair of differential inputs and an output may have one of the pair of differential inputs configured to receive the first sense voltage. A first switching device matching the power switching device may be coupled to the other one of the pair of differential inputs and the output of the first amplifier, which may operate to apply the first sense voltage across the first switching device to generate the first current.

The second sense circuit may include an input circuit configured to generate a second sense voltage independent of the switch voltage. A second amplifier having a pair of differential inputs and an output may have one of the pair of differential inputs configured to receive the second sense voltage. A second switching device matching the power switching device may be coupled to the other one of the pair of differential inputs and the output of the second amplifier, which may operate to apply the second sense voltage across the second switching device to generate the second current.

Other aspects of the present invention will become apparent with reference to the drawings and detailed description of the drawings that follow.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

As used herein, unless otherwise noted, '$W_{xxx}$', where 'xxx' is either a numerical or character index, refers to the channel width of a device designated by that numerical or character index. For example, $W_{902}$ would refer to the channel width of a switching device identified by the index '902'. Similarly, other circuit characteristics and/or properties, for example gate-source voltage $V_{GS}$, on resistance $R_{on}$, etc. may correspond to specific devices by applying an index. For example, $V_{GS\_908}$ may refer to the gate-source voltage of a switching device identified by the index '908', $R_{on\_904}$ may refer to the resistance of a switching device identified by the index '904' that is operating in its on state, and so forth. A "pair of differential inputs" refers to a pair of inputs configured as a differential input pair, and a "pair of differential outputs" refers to a pair of outputs configured as a differential output pair. For example, a differential amplifier may have a pair of differential inputs and a pair of differential outputs, with the pair of differential inputs comprising a $V_{in+}$ and a $V_{in-}$ input, and similarly, a pair of differential outputs comprising a $V_{out+}$ and a $V_{out-}$ output. A "single-ended output" refers to a single output as opposed to a pair of differential outputs.

Figure 8:
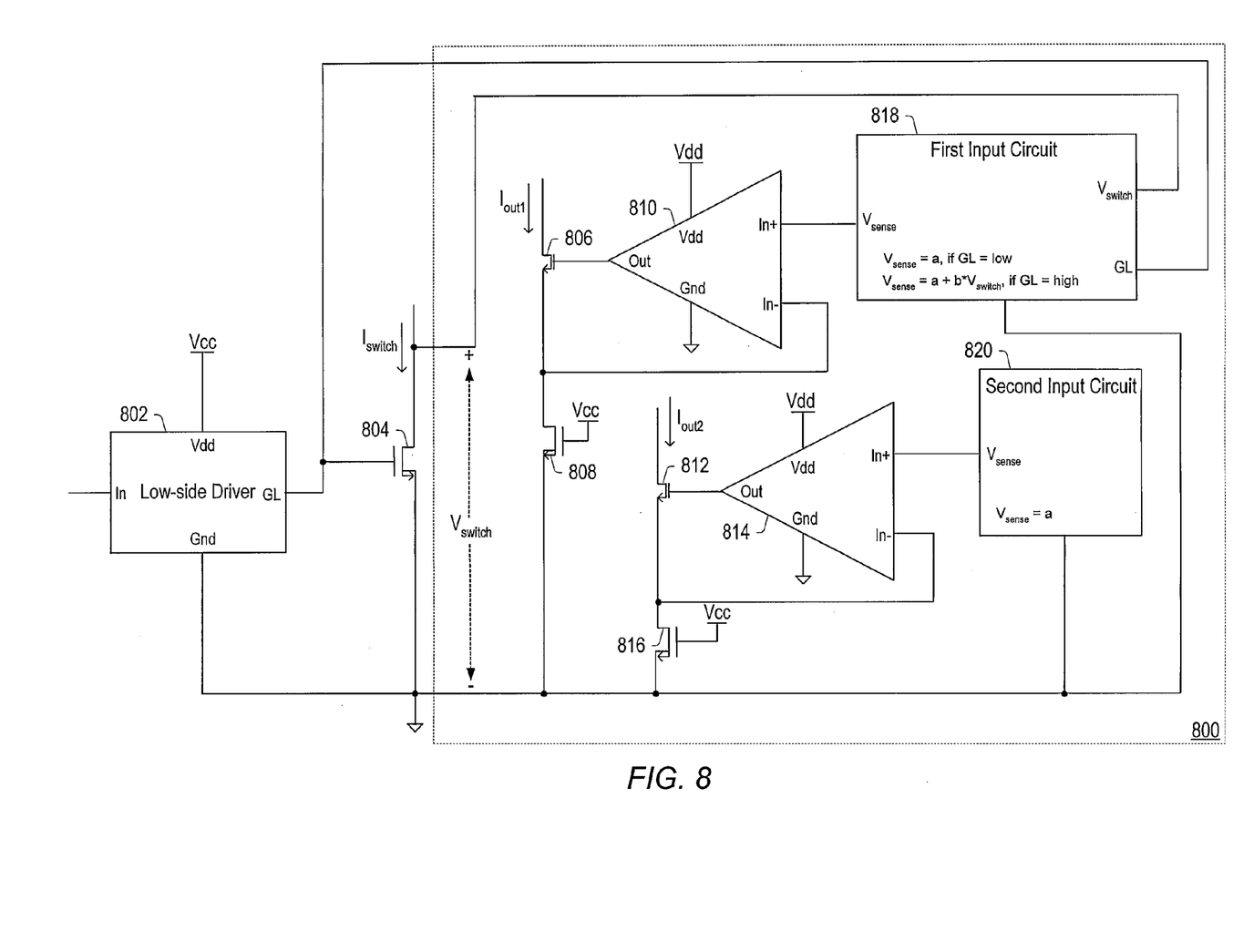
FIG. 8 shows one embodiment of a current-sense circuit, according to principles of the present invention.

FIG. 8 shows one embodiment of a process variation and temperature independent current-sense circuit 800 that can measure bi-directional switch currents conducted by switching device 804, and does not require high-speed, high-voltage amplifiers for operation. In one embodiment, a switching device 804, which may be the low-side NMOS device of the output stage of a buck converter—such as the one shown in FIG. 2, may be controlled by driver circuit 802. A current-sense circuit 800 comprising sense FETs 808 and 816, amplifiers 810 and 814, input circuits 818 and 820, and current sourcing devices 806 and 812 may be coupled to switching device 804 and configured to measure the switch current $I_{switch}$ conducted by switching device 804. Sense FETs 808 and 816 may be designed to have identical channel lengths to switching device 804.

The operation of circuit 800 when switching device 804 is driven in its on state will now be described. Power switch device 804 may be driven in its on state, resulting in switching device 804 conducting a bidirectional load current $I_{switch}$. A linear transformation may be applied to the voltage $V_{switch}$ across the channel of switching device 804 to generate a positive voltage $V_{sense}$ for the entire range of switch current $I_{switch}$, where $$V_{sense} = a + b * V_{switch} > 0.$$

The values of 'a' and 'b' may be determined by characteristics of first input circuit 818, as will be described later.

A first current $I_{out1}$ may be generated by amplifier 810, by applying voltage $V_{sense}$ across a switching device 808, which may be configured to match power switching device 804. $I_{out1}$ may be expressed as:

$$I_{out1} = \frac{a}{R_{on\_808}} + b * \frac{W_{808}}{W_{804}} * I_{switch}. \quad (9)$$

A second current $I_{out2}$ (independent of $V_{switch}$) may be generated using amplifier 814 and switching device 816, which may also be configured to match power switching device 804 (where $R_{on\_816} = R_{on\_808}$). $I_{out2}$ may be expressed as:

$$I_{out2} = \frac{a}{R_{on\_816}}. \quad (10)$$

A sensed output current $I_{sense}$ may be formed by subtracting $I_{out2}$ from $I_{out1}$, obtaining $$I_{sense} = I_{out1} - I_{out2} = b * \frac{W_{808}}{W_{804}} * I_{switch}, \quad (11)$$

since both switching devices 808 and 816 are matched to power switching device 804.

The operation of circuit 800 when switching device 804 is in the off state will now be described. A first current $I_{out1}$ may be generated using amplifier 810 and switching device 808, (which, as previously mentioned, may be configured to match power switching device 804), obtaining $$I_{out1} = \frac{a}{R_{on\_808}}.$$

A second current $I_{out2}$ may be generated using amplifier 814 and switching device 816, which, similar to switching device 808, may have been configured to match power switching device 804 (where $R_{on\_816} = R_{on\_808}$), obtaining $$I_{out2} = \frac{a}{R_{on\_816}}. \quad (13)$$

A sensed output current $I_{sense}$ may again be formed by subtracting $I_{out2}$ from $I_{out1}$, leading to $$I_{sense} = I_{out1} - I_{out2} = 0,$$

since both switching devices 808 and 816 are matched to power switching device 804. In other words, when power switching device 804 is in the off state, amplifiers 810 and 814 may operate to generate two equal currents (independent of $V_{switch}$) resulting in $I_{sense} = 0$. It should be noted however, that in some cases switching device 804 being in the off state might not guarantee a zero value for current $I_{switch}$. $I_{switch}$ may flow through the body diode of switching device 804, resulting in a nonzero $I_{sense}$ value. Therefore, in certain embodiments, $I_{sense}$ measurements may preferably be performed when switching device 804 is in the on state.

Figure 9:
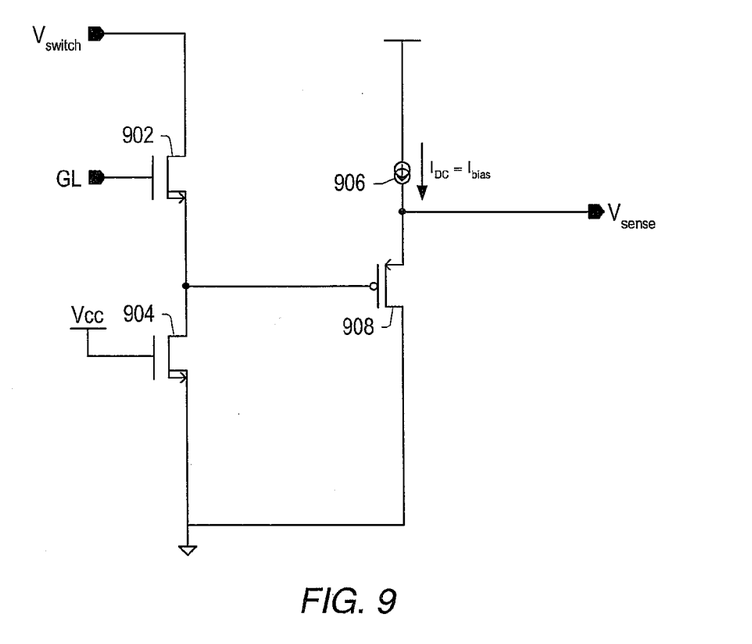
FIG. 9 shows one embodiment of the first input circuit shown in FIG. 8.
Figure 10:
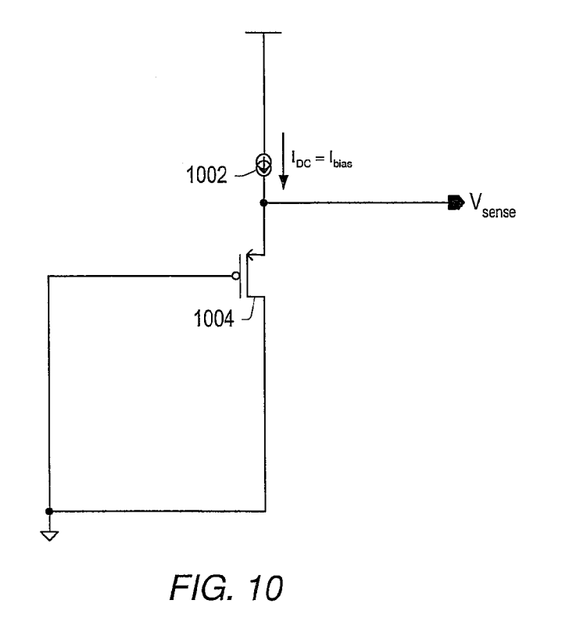
FIG. 10 shows one embodiment of the second input circuit shown in FIG. 8.

One embodiment of first input circuit 818 is shown in FIG. 9. In this embodiment, first input circuit 818 comprises NMOS devices 902 and 904 having their channels coupled together to form a voltage divider, with $V_{switch}$ coupled to the drain of NMOS device 902, and control signal GL applied to the gate of NMOS device 902. NMOS devices 902 and 904 may be designed to have identical channel lengths. The voltage at the node coupling the source of NMOS device 902 to the drain of NMOS device 904—divided down from $V_{switch}$—may be used to control an offset PMOS device 908, with a bias current $I_{bias}$ applied to PMOS device 906 to develop sense voltage $V_{sense}$ at the source of PMOS device 908. One embodiment of second input circuit 820 is shown in FIG. 10. In this embodiment, second input circuit 820 comprises an offset PMOS device 1004, which may be designed to match offset PMOS device 908 shown in FIG. 9, with bias current $I_{bias}$ applied to its source—similar to PMOS device 908 in FIG. 9—to develop sense voltage $V_{sense}$ at the source of PMOS device 1004.

Parameters 'a' and 'b' may be chosen such that $V_{sense}$ remains positive for the entire range of values of bidirectional current $I_{switch}$. Specifically if minimum $I_{switch}$ current $I_{switch\_min}$ is the most negative value of the switch current $I_{switch}$, then the following relationship may be obtained:

$$V_{GS\_908} + I_{switch\_min} * R_{on\_804} * \frac{W_{902}}{W_{902} + W_{904}} > 0, \quad (15)$$

where parameter 'a' may be defined as $V_{GS\_908}$ (which may be equal to $V_{GS\_1004}$) and parameter 'b' may be defined as $$\frac{W_{902}}{W_{902} + W_{904}}.$$

The values of $I_{switch\_min}$ and $R_{on\_804}$ may be determined by the given application. The available design variables to satisfy equation 15 in this case are $W_{902}$, $W_{904}$ and $V_{GS\_908}$. It should be noted that the voltage divider formed by devices 902 and 904 may operate to protect the gate of $V_{GS\_908}$ from the high voltage that may develop at the drain of power switching device 804 when power switching device 804 is in its off state.

When power switching device 804 is driven in its on state, $I_{sense}$ may be expressed as:

$$I_{sense} = I_{out1} - I_{out2} = b * \frac{W_{808}}{W_{804}} * I_{switch} = \frac{W_{902}}{W_{902} + W_{904}} * \frac{W_{808}}{W_{804}} * I_{switch}, \quad (16)$$

from which the ratio of $I_{switch}$ to $I_{sense}$ may be obtained:

$$\frac{I_{switch}}{I_{sense}} = \frac{W_{804}}{W_{808}} * \frac{W_{902} + W_{904}}{W_{902}}. \quad (17)$$

Therefore, the ratio $I_{switch}/I_{sense}$ is process variation and temperature independent.

From equation 15 the following relationship may be derived $$V_{GS\_908} > -I_{switch\_min} * R_{on\_804} * \frac{W_{902}}{W_{902} + W_{904}} = \quad (18)$$

$$|I_{switch\_min}| * R_{on\_804} * \frac{W_{902}}{W_{902} + W_{904}}$$

where $I_{switch\_min}$ may be designated as the most negative value $I_{switch}$ can assume in the given application. The higher the absolute value of $I_{switch,min}$ is, the higher $V_{GS\_908}$ may have to be to satisfy equation 15 for a given ratio of $$\frac{W_{902}}{W_{902} + W_{904}},$$

which may result in higher dissipation in amplifiers 810 and 814. The direction of $I_{switch}$ shown in FIG. 8 represents the positive direction of $I_{switch}$.

Figure 11:
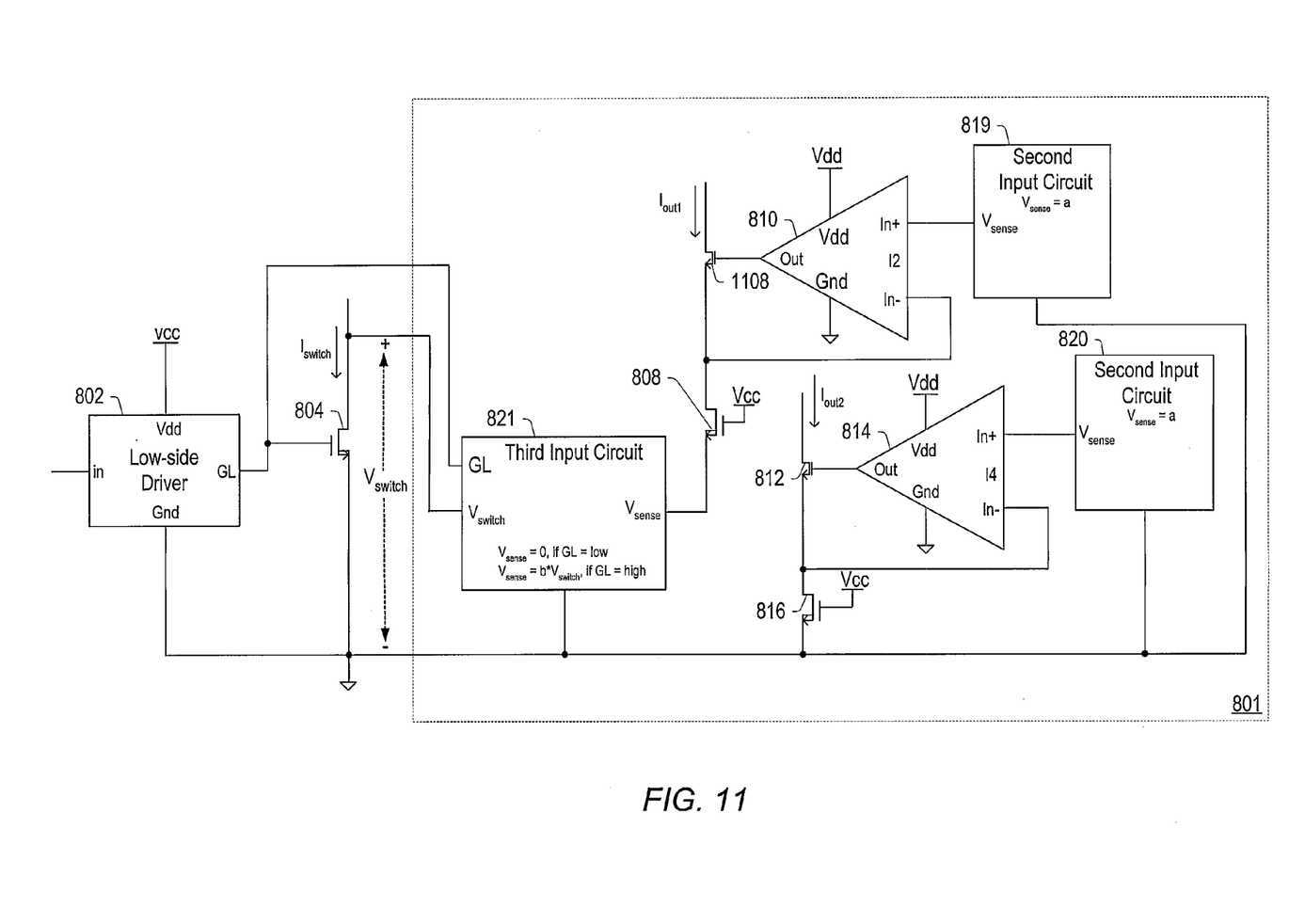
FIG. 11 shows an alternate embodiment of a current-sense circuit, according to principles of the present invention.
Figure 12:
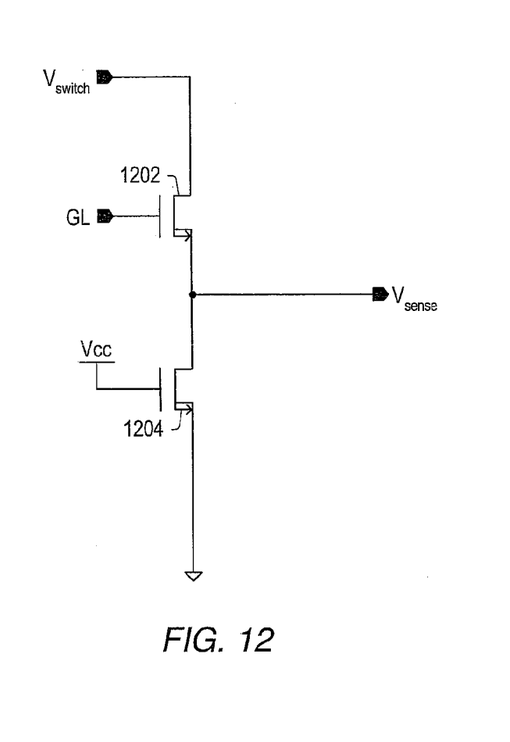
FIG. 12 shows one embodiment of the third input circuit shown in FIG. 11.

FIG. 11 shows an alternate embodiment 801 of current-sense circuit 800. In current-sense circuit 801, the functionality of first input circuit 818 (shown in FIG. 8) has been divided into two separate circuits, second input circuit 819 and third input circuit 821. Second input circuit 819 may be coupled to one of the two inputs of amplifier 810, and third input circuit 821 may be coupled to the other input of amplifier 810. One embodiment of third input circuit 821 is shown in FIG. 12. Devices 1202 and 1204 may be designed to match devices 902 and 904, respectively, shown in FIG. 9. The embodiment of second input circuit 820 shown in FIG. 10 may also be used as an embodiment for second input circuit 819.

A major functional difference between current-sense circuit 800 and current-sense circuit 801 is the input selection for amplifier 810. While the input voltage of amplifier 810 in current-sense circuit 800 is determined as 'a+b*VSwitCh' when control signal GL is asserted (logic high, in this case), the same input voltage of amplifier 810 is determined as 'a–b*V$_{switch}$' (reflecting differential input 'In+–In–') in current-sense circuit 801. Maintaining a positive differential input to amplifier 810 in for the entire range of bidirectional switch current $I_{switch}$ for current-sense circuit 801 may require that $$V_{GS\_908} - I_{switch\_max} * R_{on\_804} * \frac{W_{902}}{W_{902} + W_{904}} > 0 \text{ or} \quad (19)$$

$$V_{GS\_908} > I_{switch\_max} * R_{on\_804} * \frac{W_{902}}{W_{902} + W_{904}}. \quad (20)$$

In applications where the relationship $|I_{switch\_min}|>I_{switch\_max}$, ($I_{switch\_max}$ is the most positive value that may be assumed by switch current $I_{switch}$ in the application), is satisfied, current-sense circuit 801 may operate with a lower value for $V_{GS\_908}$. This may be observed when comparing equations 18 and 19, indicating that current-sense circuit 801 may operate with a lower $V_{GS\_908}$ for '$|I_{switch\_min}|>I_{switch\_max}$' for the same ratio $$\frac{W_{902}}{W_{902} + W_{904}}.$$

In addition, in order for the transfer function of third input circuit 821 to remain unaffected by current $I_{out1}$, the following relationship between respective channel widths of devices 902, 904 and 808 may be required:

$W_{902}, W_{904} >> W_{808}$.

It should be noted that since switching devices 1202 and 1204 may be designed to have the same properties as switching devices 902 and 904, respectively, and switching device 808 may be designed to have the same properties as switching device 816, the relationship of equation 21 equally applies when interchanging $W_{808}$ with $W_{816}$, and/or interchanging $W_{902}$ and/or $W_{904}$ with $W_{1202}$ and/or $W_{1204}$. During operation of current-sense circuit 801, the output current $I_{sense}$ may again be defined by subtracting $I_{out2}$ from $I_{out1}$, as given in equation 16, with the ratio of $I_{switch}$ to $I_{sense}$ given in equation 17.

Figure 13:
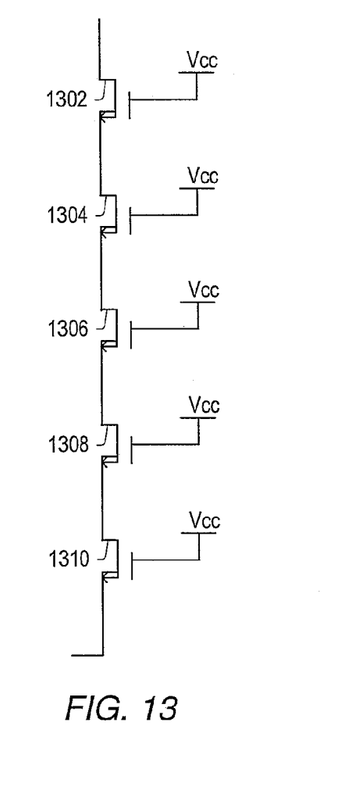
FIG. 13 shows one embodiment of one of the sensing devices shown in FIG. 11.

Switching devices 808 and 816 may either be configured as single devices matching switching device 804 (implying that the devices would have the same channel length), or they may each be configured with multiple devices coupled in series, as shown in FIG. 13. In the embodiment shown in FIG. 13, each of switching devices 1302-1310 may have identical channel lengths and a larger channel width to improve their matching switching device 804, while simultaneously maintaining the relationship $W_{804}>>W_{effective}$, where $W_{effective}$ is the effective combined channel width of series-coupled switching devices 1302-1310.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A system for sensing current in a power switching device, the system comprising:
   a first sense circuit coupled to the power switching device, and configured to generate a first current for positive and/or negative values of a switch current conducted by the power switching device; and
   a second sense circuit coupled to the power switching device, and configured to generate a second current for positive and/or negative values of the switch current;
   wherein a sense current obtained by subtracting the second current from the first current is proportional to the switch current;
   wherein a ratio of the sense current and the switch current is independent of process variation and temperature; and
   wherein generation of the first current by the first sense circuit and generation of the second current by the second sense circuit is unaffected if a high voltage is developed across the power switching device.

2. The system of claim 1, wherein the first circuit comprises:
an input circuit configured to generate a first sense voltage (V1) based on:
a control voltage used to control the power switching device; and
a switch voltage (V2) developed across the power switching device according to the switch current;
an amplifier having a pair of differential inputs and an output, wherein one of the pair of differential inputs is configured to receive the first sense voltage; and
a first switching device coupled to the other one of the pair of differential inputs and the output of the amplifier;
wherein the amplifier is operable to apply the first sense voltage across the first switching device to generate the first current.

3. The system of claim 2, wherein the first sense voltage is positive for positive and/or negative values of the switch current.

4. The system of claim 1, wherein a channel length of the first switching device is identical to a channel length of the power switching device.

5. The system of claim 1, wherein the first switching device comprises a plurality (P) of switching devices coupled in series, wherein each of the P switching devices has a channel width, wherein an effective channel width of the P switching devices coupled in series is obtained by dividing the channel width by P, wherein the effective channel width is substantially lower than a channel width of the power switching device.

6. The system of claim 2, wherein the input circuit comprises:
a second switching device having a channel coupled between a first supply voltage and a second supply voltage that is lower than the first supply voltage; and
third and fourth switching devices configured to form a voltage divider to produce a divided-down voltage from the switch voltage according to the control voltage;
wherein the divided-down voltage controls the fourth switching device to develop the first sense voltage across the fourth switching device.

7. The system of claim 6, wherein the second supply voltage is ground.

8. The system of claim 2, wherein the input circuit comprises:
second, third and fourth switching devices having second, third and fourth control terminals and second, third and fourth pairs of channel terminals, respectively;
wherein one of the second pair of channel terminals is configured to receive the switch voltage, the second control terminal is configured to receive the control voltage, and the third control terminal is configured to receive a first supply voltage;
wherein the other one of the second pair of channel terminals, one of the third pair of channel terminals, and the fourth control terminal are coupled to a common node;
wherein the other one of the third pair of channel terminals and one of the fourth pair of channel terminals is coupled to a second supply voltage that is lower than the first supply voltage;
wherein the other one of the fourth pair of channel terminals is coupled to the first supply voltage; and
wherein the first sense voltage is developed across the fourth switching device.

9. The system of claim 8;
wherein $V1=N+(M*V2)$, wherein N is a voltage developed between the fourth control terminal and the one of the fourth pair of channel terminals; and
wherein $M=W1/(W1+W2)$, wherein W1 is the channel width of the second switching device and W2 is the channel width of the third switching device.

10. The system of claim 1, wherein the second circuit comprises:
an input circuit configured to generate a second sense voltage independent of a switch voltage developed across the power switching device according to the switch current;
an amplifier having a pair of differential inputs and an output, wherein one of the pair of differential inputs is configured to receive the second sense voltage; and
a first switching device coupled to the other one of the pair of differential inputs and the output of the amplifier;
wherein the amplifier is operable to apply the second sense voltage across the first switching device to generate the second current.

11. The system of claim 10, wherein a channel length of the first switching device is identical to a channel length of the power switching device.

12. The system of claim 10, wherein the input circuit comprises:
a second switching device having a first channel terminal coupled to a first supply voltage and a second channel terminal coupled to a second supply voltage that is lower than the first supply voltage;
the second switching device further having a control terminal coupled to the second supply voltage to develop the second sense voltage across the second switching device.

13. The system of claim 12, wherein a value of the second sense voltage is equivalent to a voltage developed between the control terminal and the second channel terminal of the second switching device.

14. The system of claim 1, wherein the first circuit comprises:
a first input circuit configured to generate a first sense voltage (V1) based on:
a control voltage used to control the power switching device; and
a switch voltage (V2) developed across the power switching device according to the switch current;
a second input circuit configured to generate a second sense voltage independent of the switch voltage;
an amplifier having a pair of differential inputs and an output, wherein one of the pair of differential inputs is configured to receive the second sense voltage;
a first switching device having a first channel terminal configured to receive the first sense voltage, and a second channel terminal coupled to the other one of the pair of differential inputs and the output of the amplifier;
wherein the amplifier is operable to apply the first sense voltage across the first switching device to generate the first current.

15. The system of claim 14, wherein the first input circuit comprises:
second and third switching devices configured to form a voltage divider to produce a divided-down voltage from the switch voltage according to the control voltage;

wherein the divided-down voltage is the first sense voltage.

16. The system of claim 14;
wherein V1=N*V2;
wherein N=W1/(W1+W2), wherein W1 is the channel width of the second switching device and W2 is the channel width of the third switching device.

17. The system of claim 16, wherein W1, W2>>W3, wherein W3 is the channel width of the first switching device.

18. A switching power regulator comprising:
a power switching device having first and second channel terminals and a control terminal, wherein the first channel terminal is coupled to a voltage reference, wherein the power switching device is configured to provide a load current at the second channel terminal;
a first sense circuit having a first input coupled to the control terminal of the power switching device, a second input coupled to the second channel terminal of the power switching device, and a third input coupled to the voltage reference, wherein the first sense circuit is operable to produce a first current when the load current is positive and/or negative; and
a second sense circuit having an input coupled to the voltage reference, wherein the second sense circuit is operable to produce a second current when the load current is positive and/or negative;
wherein a sense current obtained by subtracting the second current from the first current is proportional to the load current;
wherein a ratio of the sense current and the load current is independent of process variation and temperature;
wherein in producing the first current, the first circuit is unaffected if a high voltage is developed across the power switching device.

19. A method comprising:
(a) generating a positive sense voltage (V1) for positive and/or negative values of a switch current conducted by a power switching device, by applying a linear transformation to a switch voltage (V2) developed across the power switching device according to the switch current;
(b) generating a first current by applying the positive sense voltage across a first switching device having a same channel length as the first switching device;
(c) generating a second current that is independent of the switch voltage;
(d) obtaining a sense current that is proportional to the switch current by subtracting the second current from the first current.

20. The method of claim 19, wherein a ratio of the switch current and the sense current is independent of process variation and temperature.

21. The method of claim 19, wherein performing (a)-(d) does not require high-speed, high-voltage amplifiers.

22. The method claim 19, wherein the sense current is zero when the power switching device is in an off state.

23. The method of claim 19, wherein V1=N+(M*V2), when the first switching device is in an on state;
wherein N and M are constants determined by characteristics of selected circuit components used in generating the first and the second current.

* * * * *